(12) United States Patent
Afsah

(10) Patent No.: US 6,509,730 B1
(45) Date of Patent: Jan. 21, 2003

(54) METHOD OF ENVIRONMENTAL PERFORMANCE MEASUREMENT

(75) Inventor: Shakeb Afsah, Bethesda, MD (US)

(73) Assignee: International Resources Group Ltd., Washington, DC (US)

( * ) Notice: Subject to any disclaimer, the term of this patent is extended or adjusted under 35 U.S.C. 154(b) by 5 days.

(21) Appl. No.: 09/792,044

(22) Filed: Feb. 26, 2001

Related U.S. Application Data

(60) Provisional application No. 60/185,129, filed on Feb. 25, 2000.

(51) Int. Cl.[7] .................................................. G01R 1/04

(52) U.S. Cl. ...................................... 324/158.1; 705/10

(58) Field of Search .............................. 324/556, 158.1; 700/28, 31; 705/1, 7, 8, 9, 10

(56) References Cited

U.S. PATENT DOCUMENTS

| | | | | |
|---|---|---|---|---|
| 5,680,305 A | * | 10/1997 | Apgar | 364/401 R |
| 6,178,362 B1 | * | 1/2001 | Woolard et al. | 700/295 |
| 6,324,514 B2 | * | 11/2001 | Bingham et al. | 705/8 |

* cited by examiner

Primary Examiner—N. Le
Assistant Examiner—Etienne P LeRoux
(74) Attorney, Agent, or Firm—Roylance, Abrams, Berdo & Goodman, L.L.P.

(57) ABSTRACT

A method of measuring the performance of facility based on either a single or multiple performance or environmental indicators. Particularly, the method involves a comparison of ideal benchmark values of particular performance indicators to the indicator values of the performance indicator of the facility. The method also includes comparing the performance of a first facility to a second facility based on multiple performance indications and the indicators being different for each of the facilities, respectively.

12 Claims, 5 Drawing Sheets

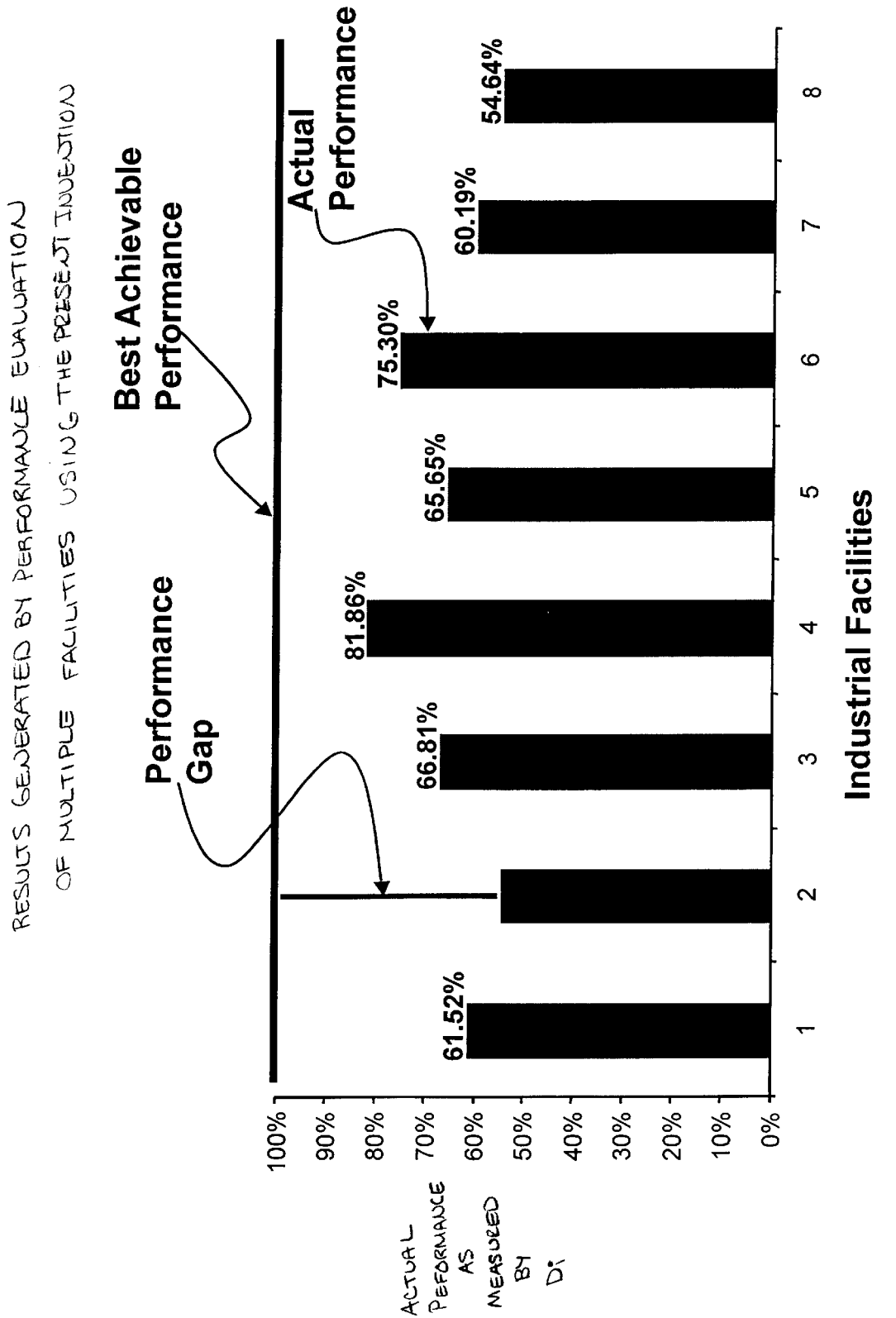

METHOD OF ENVIRONMENTAL PERFORMANCE MEASUREMENT

RELATED APPLICATIONS

This application claims, under 35 U.S.C §119(e), the benefit of U.S. Provisional Application No. 60/185,129 filed on Feb. 25, 2000, the subject matter of which is incorporated herein by reference.

FIELD OF THE INVENTION

The present invention generally relates to a method for measuring the environmental performance of particular facilities based on known performance or environmental indicators. More specifically, the method of measuring performance involves comparing the benchmark values of the individual environmental indicators to the actual indicator values of the environmental indicators produced by the facilities. The method allows performance evaluation and comparison of more than one facility, even when based on different indicators for each facility.

BACKGROUND OF THE INVENTION

Measuring the environmental performance of a facility provides an effective way of evaluating the efficiency and profitability of the facility, the injury to the environment, the compliance with current regulations, and the standing of the facility in the market place. Typically, performance evaluation of a facility is based on multiple performance or environmental indicators that vary depending on its nature of production or service activities. Some environmental indicators include for example, amount of energy, materials, land and water use, amount of emissions released, compliance with regulations, or number of accidents. Since different indicators may apply to different facilities, evaluation of one facility is usually based on a group of performance indicators that are different from the group of indicators used to evaluate another facility.

Conventionally, in order to compare the performance of one facility against the performance of another facility based on different performance indicators for each facility, respectively, a conversion factor or weighing scheme is applied. For example, where $I_1$ and $I_2$ represent values of two different performance indicators for two facilities P1 and P2, respectively, performance is measured by expressing P1 and P2 in terms of $I_1$ and $I_2$. In mathematical terms, a conversion factor is applied such that $I_1 = \alpha I_2$.

However, the science behind the selection of the value of such conversion factors or weights is highly debatable. Therefore, under the conventional approach, an imprecise or inaccurate evaluation and comparison of the performances of the different facilities based on different performance indicators may result.

SUMMARY OF THE INVENTION

Accordingly, an object of the present invention is to provide a method of evaluating the environmental performance of a facility based on a comparison of benchmark values of performance indicators, thereby providing a more precise evaluation of performance.

Another object of the present invention is to provide a method of evaluating the environmental performance of more that one facility based on different performance indicators of each facility, respectively.

Yet another object of the present invention is to provide a method of evaluating the environmental performance of more than one facility that allows comparison of the performances of each facility, even when the performance evaluations are based on different performance indicators of each facility.

The foregoing objects are basically attained by a method of measuring and reporting environmental performance of each of first and second facilities, respectively, based on a single environmental indicator of each facility, respectively, comprising the steps of selecting a first environmental indicator from the first facility, and a second environmental indicator from the second facility, identifying a first indicator value of the first environmental indicator, and identifying a second indicator value for the second environmental indicator. The method also includes the steps of determining a first benchmark value of the first environmental indicator and a second benchmark value for the second environmental indicator, determining a first performance value of the first facility by dividing the first benchmark value by the second indicator value, and determining a second performance value of the second facility by dividing the second benchmark value by the second indicator value. The method further includes the steps of reporting the first and second performance values, respectively, and comparing the first performance value to the second performance value.

The foregoing objects are also basically attained by a method of measuring and reporting environmental performance of first and second facilities based on multiple environmental indicators of the first and second facilities, respectively, comprising the steps of selecting a plurality of first environmental indicators from the first facility, each of the first environmental indicators, respectively, being different from each other, determining the total number, n1, of the first environmental indicators by summing the number of first environmental indicators, and identifying first indicator values $I1_i$ of each of the first environmental indicators, respectively. The method also includes identifying first benchmark values, $B1_i$, for each of the first environmental indicators, respectively, and determining a first performance value, $D1_i$, of the first facility by the formula:

$$D1_i = \left[ \frac{n1}{\sum_{i=1}^{n} \left[ \frac{I1_i}{B1_i} \right]^2} \right]^{\frac{1}{2}}$$

and reporting the first performance value of the first facility.

The above method provides a effective way of both measuring performance of individual facilities based on different indicators, and comparing the performance of different facilities. This method of performance evaluation will provide direct financial benefits to the facility, direct organizational management benefits, and indirect financial benefits, such as improving market reputation.

Other objects, advantages and salient features of the invention will become apparent from the following detailed description, which, taken in conjunction with annexed drawings, discloses the preferred embodiments of the present invention.

BRIEF DESCRIPTION OF THE DRAWINGS

Referring to the drawings which form a part of this disclosure:

FIG. 5 is a graph illustrating exemplary results from application of the performance evaluation of multiple facilities based on multiple performance indicators in accordance with an embodiment of the present invention.

DETAILED DESCRIPTION OF THE INVENTION

Referring to FIGS. 1–5, the present invention relates to a method of evaluating the performance of a facility based on either a single performance or environmental indicator or multiple indicators. The present invention also relates to a method of comparing the evaluated performances of multiple facilities against one another and the group of performance indicators used to evaluate one facility can be any combination of indicators whether the same or different from the group of indicators used to evaluate another facility.

As an example, the performance of a first facility can be evaluated based on energy use, emissions to land, and emissions to air indicators and the performance of a second facility can be evaluated based on a different group of indicators such as energy use, water use, and emissions to water. The performance values of each facility can then be directly compared to determine which facility performs better than the other facility. Thus, the present invention provides an integrated performance analysis for individual facilities based on any combination of performance indicators and provides a way of directly comparing the performances of multiple facilities. Once the performance of a facility or facilities has been evaluated, an environmental performance report, such as the graphs shown in FIGS. 4 and 5, can outline the results of the evaluation and facilitate a subsequent analysis thereof.

The method of the present invention provides a more precise and accurate measure of performance of a facility over the conventional methods. This results in a better analysis of both why a particular facility may not operate at optimum performance, and how a particular facility compares to other facilities in the market.

Figure 1:
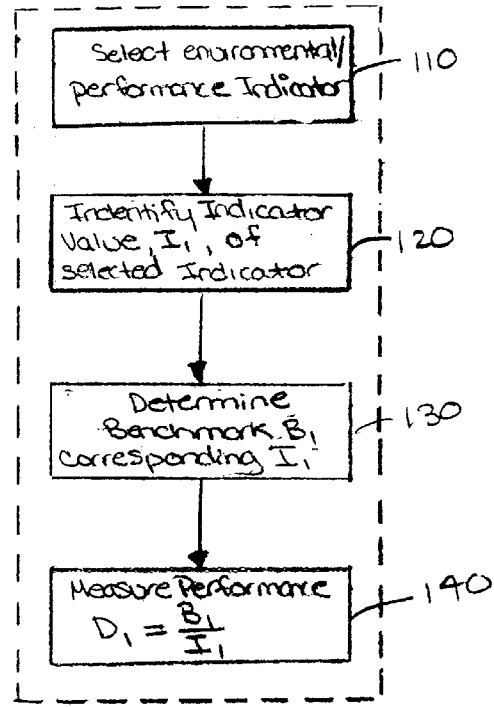
FIG. 1 is a flow chart illustrating exemplary steps for evaluating and comparing the environmental performance of two facilities in accordance with an embodiment of the present invention.
Figure 1:
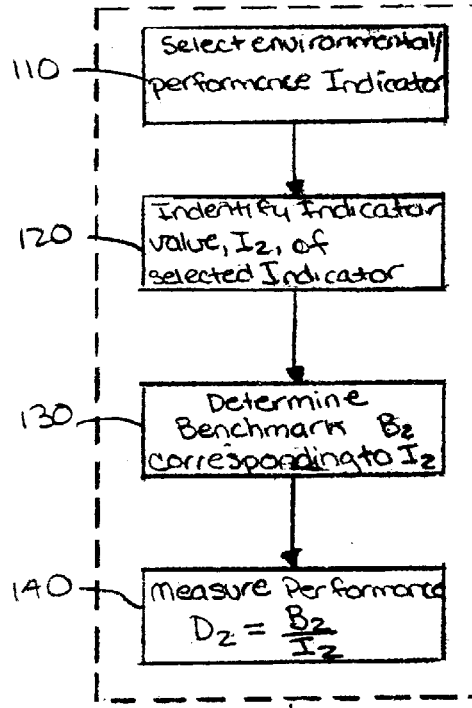
Figure 1:
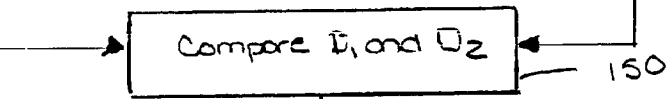
Figure 1:
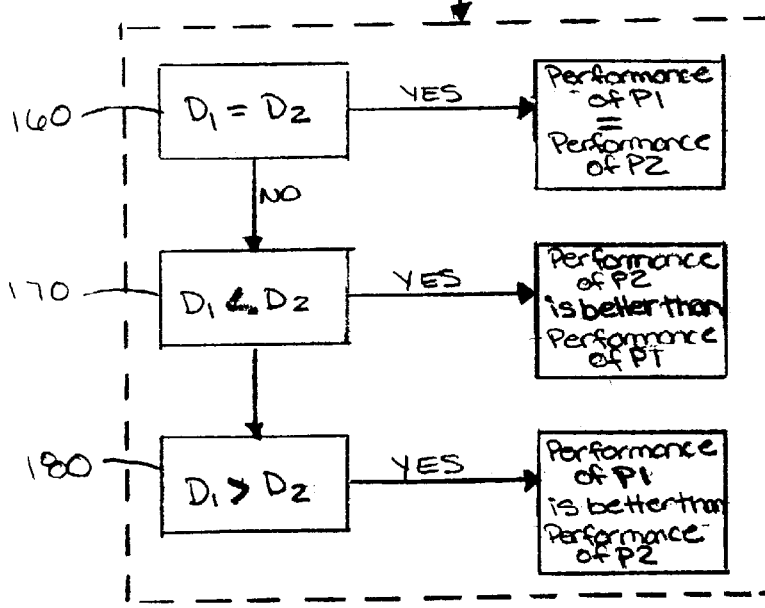

As seen in FIG. 1, exemplary steps for evaluating and comparing the performance of two facilities based on a single performance indicator of each facility are shown. The performance of first and second facilities P1 and P2 can be evaluated and then compared to determine which of the first and second facilities P1 and P2 performs better. Specifically, a performance indicator of first facility P1 is selected and a performance indicator of second facility P2 is selected in step 110.

Examples of typical performance indicators generally include energy use, material use, water use, emissions to land, emissions to air, emissions to water, transportation, suppliers, products, and services, land use, compliance, accidents and profit. Energy use includes for example, total energy use, total use from renewable sources, and total energy indexed to production. Materials use includes factors such as, total material use, total material use indexed to production, total recycled materials used, total renewable materials used, total non-renewable material used, and total hazardous material used. Emissions to land, air, and water can include toxic waste generated, total carcinogens released, total conventional air emissions, and total wastewater discharged.

The transportation indicator includes for example, total employee commuter miles traveled and percent by automobile or public transit, and total number of company vehicles and whether powered by alternative fuels. The supplier indicator generally includes incidents of non-compliance with both regulatory and company standards. Product and services includes the percentage of product sold that is returned to the company for disposal, and the percentage of product returned that is recycled into new product. Land use includes for example, amount of land owned, leased, or managed, number of contaminated land sites, and amount of land preserved through conservation activities. Compliance includes total number of penalties and dollar amount of total penalties. Accidents include total toxics accidentally released, total number of oil and chemical spills, and annual number of fatalities, The performance indicators of P1 and P2, respectively, can either be the same or different. Indicator values $I_1$ and $I_2$ corresponding to each performance indicator of first and second facilities P1 and P2, respectively, are identified from testing each of the facilities in step 120. Benchmark values $B_1$ and $B_2$, which represent the ideal value for a particular indicator, corresponding to indicator values $I_1$ and $I_2$ are determined in step 130, as will be described in more detail below. Where minimum indicator valves are best, for example the lowest emission value is best, indicator values $I_1$ and $I_2$ can then be compared to the benchmark values $B_1$ and $B_2$, respectively, to evaluate the performance of each facility P1 and P2 in step 140.

In particular, the difference between $I_1$ and $I_2$ from their respective benchmarks $B_1$ and $B_2$ is determined by:

$$D_1 = \frac{B_1}{I_1} \quad \text{and} \quad D_2 = \frac{B_2}{I_2}.$$

This ratio becomes a measure of the distance of each indicator value $I_1$ and $I_2$ from its benchmark value $B_1$ and $B_2$ on a scale of 0 to 100%, because generally the indicator values are more than or equal to their corresponding benchmark values. However, if the indicator value is less than its benchmark value, then in statistical terms the indicator value equals the benchmark value.

The performance of first facility P1 can be measured either before, after, or at the same time as the performance measurement of second facility P2 and vise versa. The performances of first and second facilities P1 and P2 can then be compared in step 150 by comparing $D_1$ and $D_2$ even when indicators $I_1$ and $I_2$ are different. Specifically, three different scenarios can occur. A first scenario 160 is when $D_1$ is equal to $D_2$ then the performances of first and second facilities P1 and P2 are equal. A second scenario 170 is when $D_1$ is less than $D_2$, then performance of second facility P2 is better than first facility P1. A third scenario 180 is when $D_1$ is greater than $D_2$, then performance of first facility P1 is better than second facility P2.

Typically, however, the performance of an individual facility is based on multiple indicators rather than just a single indicator. Thus, when there is more than one indicator, the performance of a facility is measured by distance $D_i$, which is determined by:

$$D_i = \left[ \frac{n}{\sum_{i=1}^{n} \left[\frac{I_i}{B_i}\right]^2} \right]^{\frac{1}{2}}$$

where n equals the total number of indicators, $I_i$ represents the indicator values for performance indicators 1 through n, and $B_i$ represents the benchmark values for the performance indicators 1 through n. As described above, $D_i$ will always be between 0 to 100% since the indicator values $I_i$ are usually less than their corresponding benchmark values $B_i$.

Figure 2:
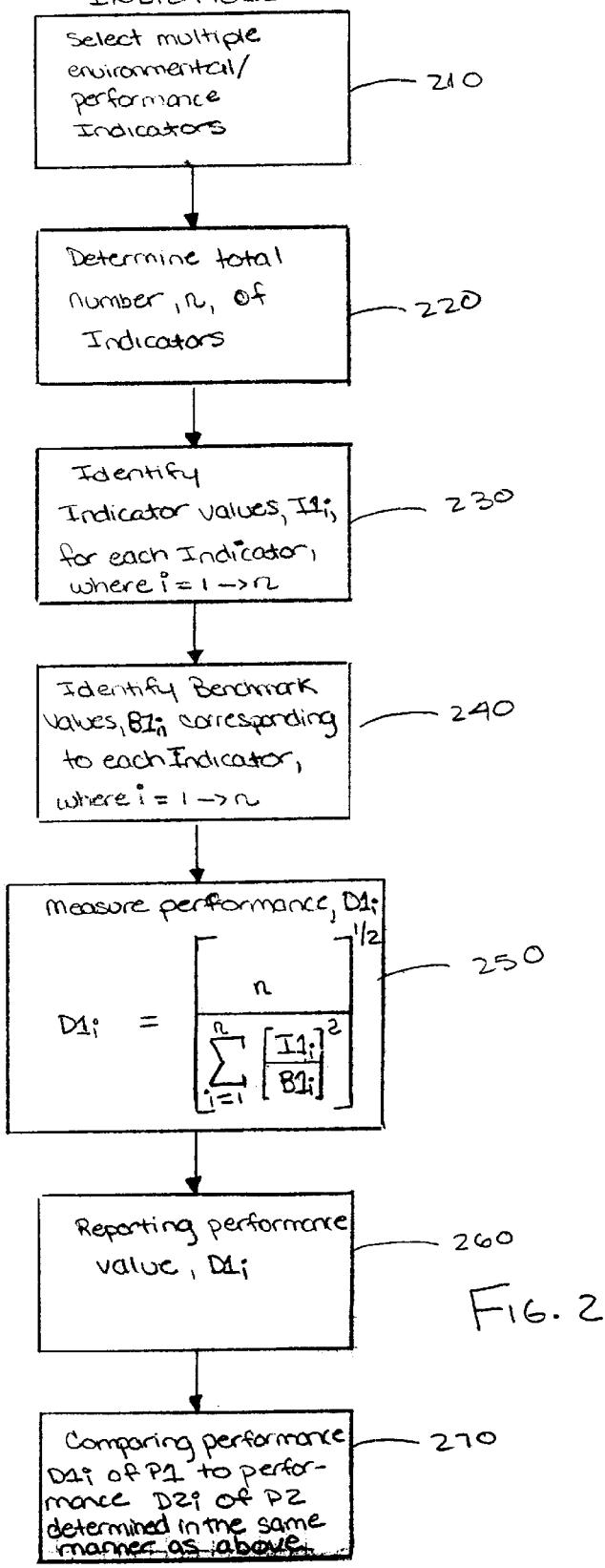
FIG. 2 is a flow chart illustrating exemplary steps for evaluating and comparing the environmental performance of two facilities based on multiple performance indicators in accordance with an embodiment of the present invention.

As seen in FIG. 2, exemplary steps in determining $D_i$ for first facility P1 using the above formula are shown. Particular indicators of first facility P1 are selected to evaluate the performance of the facility in step 210. The total number, n, of the indicators is determined simply by summing the number of indicators selected in step 220. Indicator values $I1_i$ are identified for each indicator, respectively, by testing facility P1 in step 230. These indicator values can be identified either before or after the total number, n, of the indicators are determined.

Once the indicator values $I1_i$ are identified, their corresponding benchmark values $B1_i$, representing the ideal values of each indicator 1 through n, can then be determined in step 240, as will be described below. Using the above formula with n total number of performance indicators, indicator values $I1_i$, and benchmark values $B1_i$, $D1_I$ is determined in step 250, as seen in FIG. 2.

The distance $D1_i$ represents the performance of first facility P1 based of multiple indicators 1 through n. Once the performance of facility P1 is determined, it can be reported and compared to the performance of a second facility P2 in steps 260 and 270, as seen in the graph shown in FIG. 5. The performance of facility P2 is measured by determining distance $D2_i$ using the same steps 210, 220, 230, 240, 250, and 260, as describe above with respect to first facility P1. The performance of second facility P2 can be determined either before, after, or at the same time as the performance evaluation of first facility P1 and vise versa.

Figure 3:
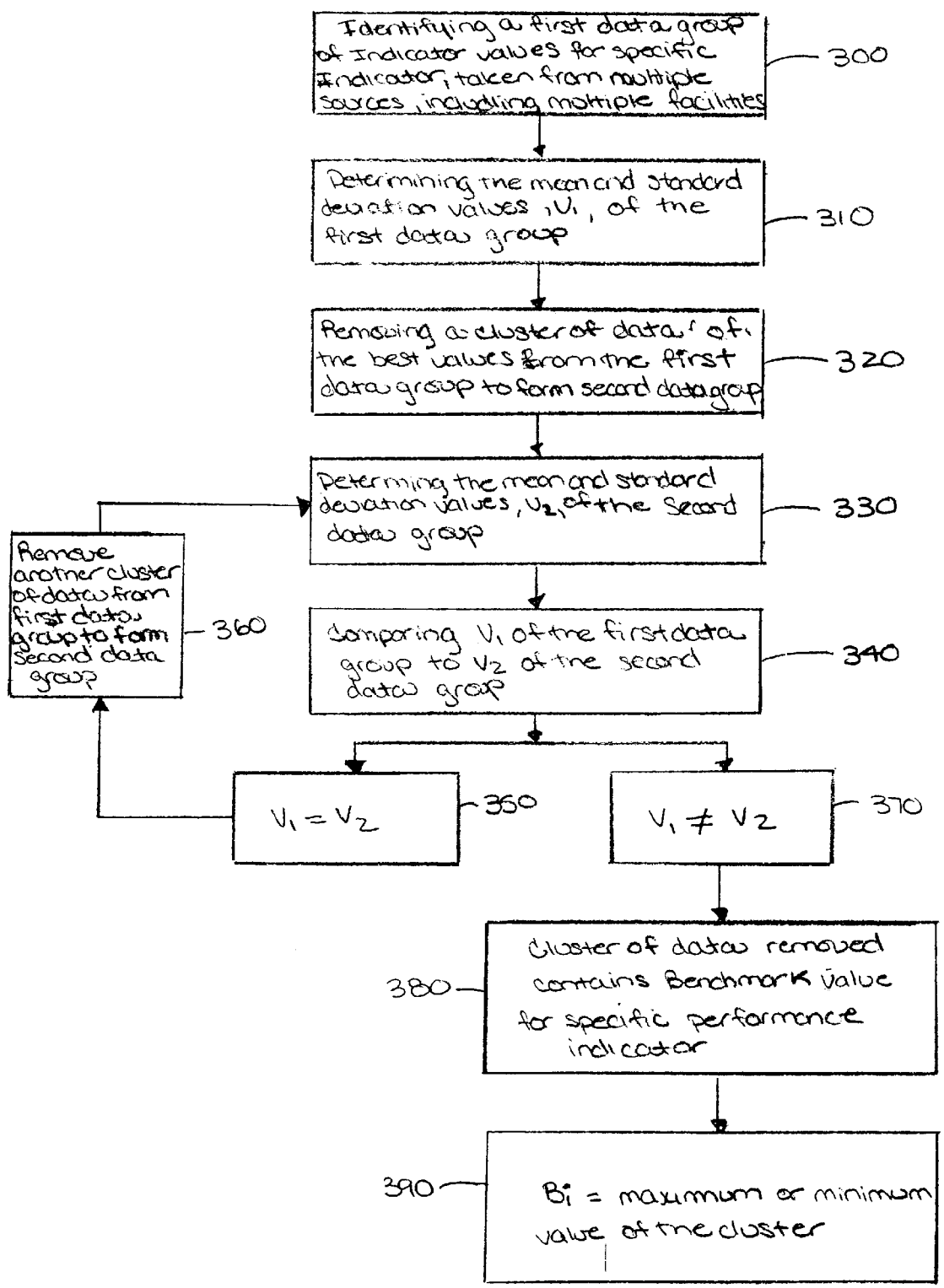
FIG. 3 is a flow chart illustrating exemplary steps for determining the benchmark value for evaluating the environmental performance of a facility based on multiple performance indicators in accordance with an embodiment of the present invention.

As seen in FIG. 3, exemplary steps are shown for determining the benchmark value B1 of a single performance indicator. A first data group containing data from a variety of sources including indicator values from multiple facilities is identified in step 300. The mean and standard deviation values V1 of the first data group are determined in step 310. A second data group is then formed by removing a cluster of data of the best values from the first data group in step 320. The mean and standard deviation values V2 of the second data group are determined in step 330.

Once the mean and standard deviation values V1 and V2 of the first and second data groups are determined, the values V1 and V2 can be compared in step 340. The comparison will result in two situations. The first situation 350 is when V1 is equal to V2. In this situation, another cluster of data is removed in step 360 from the first data group to form another new second data group and the above steps 330 and 340 are repeated using the mean and standard deviation values of the new second data group until the second situation is reached.

The second situation 370 is when V1 does not equal V2. In this situation the cluster of data removed from the first date group contains the benchmark value for the particular indicator in step 380. The specific benchmark value B1 is determined by taking the maximum or minimum value of the cluster in step 390. Whether the maximum or minimum value is used depends of the particular indicator. For example, if the indicator is the amount of emissions to air, the minimum value of the cluster would be used since less is better. If the indicator is the amount of recycled materials used, the maximum value of the cluster would be used since more is better. As an alternative to using the maximum or minimum value of the cluster, the average value of the cluster can be used as the benchmark value.

Although the above method for determining the benchmark value of a particular indicator is preferred, there are other ways of identifying a benchmark value. For example, either the limit value of an indicator mandated by compliance regulations, or an historical baseline value can be used as the benchmark value for an indicator. Also the quartile approach can he used where the data group of indicator values is divided into quartiles and the worst value from the best quartile is selected as the benchmark value. Similarly, the best 10% approach can be used where the best 10% of the indicator value data group is selected and the worst value of the best 10% is designated as the benchmark value.

Figure 4:
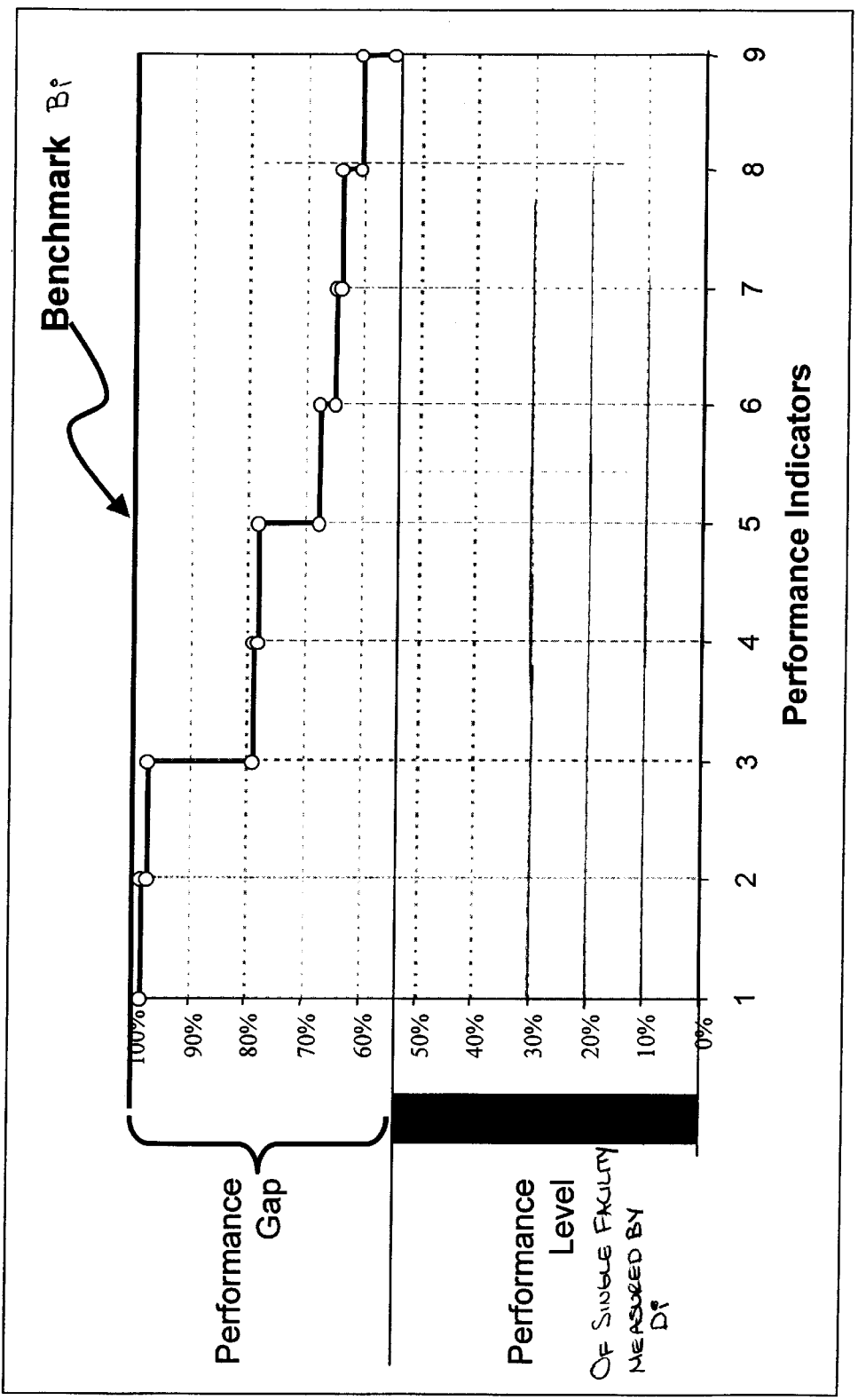
FIG. 4 is a graph illustrating exemplary results from application of the performance evaluation of a single facility and multiple performance indicators in accordance with an embodiment of the present invention.

Once the performance of a particular facility is measured the results generated by the performance evaluation can be reported, documented, and analyzed. In particular, the graph in FIG. 4 shows an example report of the performance of a single facility based on indicators one through nine measured in accordance with the present invention by the distance $D_i$, as described above. The graph illustrates the performance gap for each indicator, thereby showing which indicators are furthermost from their ideal benchmark values, and thus pin pointing which environmental indicators are hindering the performance efficiency of the facility the most.

FIG. 5 illustrates an example of reporting the results generated from the performance evaluation of multiple facilities based on multiple indicators in accordance with the present invention. The graph shows the actual performance of facilities one through eight as measured by the distance $D_i$, as described above, and compared to the best achievable performance of 100%.

By employing the method of the present invention to evaluate the performance of a facility, a more precise and accurate performance evaluation over the conventional methods can be determined. This in turn provides a better analysis of both why a particular facility may have a performance gap, and how a particular facility compares to other facilities.

Measuring and analyzing the performance of a facility by the method described above is the initial step in determining the overall performance efficiency of a facility. Subsequent steps include evaluating the commitment of a facility to efficient performance and the capacity of the facility to obtain optimal performance. In particular, the commitment evaluation of the facility includes for example, whether the company or facility has an environmental performance policy, the content of such a policy, and the existence of environmental leadership within the company. The capacity evaluation of the facility includes for example, the amount of training for staff, the amount of money allocated or spent, and the existence of management review. These subsequent steps facilitate the evaluation of why a facility may have a performance gap, such as whether the facility requires improved technology or improved management practices.

By correcting identified problems of the facility, superior environmental performance can be obtained for that facility, thereby resulting in an increase in profitability. Other benefits are achieved by superior environmental performance including for example a reduction in business risk, a measure of corporate management quality is provided, improved resource efficiency, minimized cost of waste management, lower cost of regulator compliance, strengthen the environment, and improved company reputation and image.

While particular embodiments have been chosen to illustrate the invention, it will be understood by those skilled in the art that various changes and modifications can be made therein without departing from the scope of the invention as defined in the appended claims.

What is claimed is:

1. A method of measuring and reporting environmental performance of each of first and second facilities, respectively, based on a single environmental indicator of each facility, respectively, comprising the steps of:

selecting a first environmental indicator from the first facility, and a second environmental indicator from the second facility;

identifying a first indicator value of the first environmental indicator, and a second indicator value for the second environmental indicator;

determining a first benchmark value of the first environmental indicator, and a second benchmark value for the second environmental indicator;

determining a first performance value of the first facility by dividing the first benchmark value by the first indicator value;

determining a second performance value of the second facility by dividing the second benchmark value by the second indicator value;

reporting the first and second performance values, respectively; and comparing the first performance value to the second performance value.

2. The method of measuring and reporting environmental performance of each of first and second facilities according to claim 1, wherein the first environmental indicator is different from the second environmental indicator.

3. The method of measuring and reporting environmental performance of each of first and second facilities according to claim 2, wherein when the comparison of the first and second performance values is the first performance value is equal to the second performance value, the performance of the first facility is the same as the performance of the second facility.

4. The method of measuring and reporting environmental performance of each of first and second facilities according to claim 2, wherein when the comparison of the first and second performance values is the first performance value is greater than the second performance value, the performance of the second facility is better than the performance of the first facility.

5. The method of measuring and reporting environmental performance of each of first and second facilities according to claim 2, wherein when the comparison of the first and second performance values is the first performance value is less than the second performance value, the performance of the first facility is better than the performance of the second facility.

6. A method of measuring and reporting environmental performance of first and second facilities based on multiple environmental indicators of the first and second facilities, respectively, comprising the steps of:

selecting a plurality of first environmental indicators from the first facility, each of the first environmental indicators, respectively, being different from each other;

determining the total number, n1, of the first environmental indicators by summing the number of first environmental indicators;

identifying first indicator values, $I1_i$, of each of the first environmental indicators, respectively;

identifying first benchmark values, $B1_i$, for each of the first environmental indicators, respectively;

determining a first performance value, $D1_i$, of the first facility by the formula:

$$D1_i = \left[ \frac{n1}{\sum_{i=1}^{n}\left[\frac{I1_i}{B1_i}\right]^2} \right]^{\frac{1}{2}}; \text{ and}$$

reporting the first performance value of the first facility.

7. The method of measuring and reporting environmental performance of first and second facilities, according to claim 6, further comprising the steps of:

selecting a plurality of second environmental indicators from the second facility, each of the second environmental indicators, respectively, being different from each other;

determining the total number, n2, of the second environmental indicators by summing the number of first environmental indicators;

identifying second indicator values, $I2_i$, of each of the second environmental indicators, respectively;

identifying second benchmark values, $B2_i$, for each of the second environmental indicators, respectively;

determining a second performance value, $D2_i$, of the second facility by the formula:

$$D2_i = \left[ \frac{n2}{\sum_{i=1}^{n}\left[\frac{I2_i}{B2_i}\right]^2} \right]^{\frac{1}{2}}; \text{ and}$$

reporting the second performance value of the second facility.

8. The method of measuring and reporting environmental performance of first and second facilities, according to claim 6, further comprising the step of:

comparing the first performance value of the first facility to the second performance value of the second facility.

9. The method of measuring and reporting environmental performance of first and second facilities, according to claim 6, wherein when the comparison of the first and second performance values is the first performance value is equal to the second performance value, the performance of the first facility is the same as the performance of the second facility.

10. The method of measuring and reporting environmental performance of first and second facilities, according to claim 6, wherein when the comparison of the first and second performance values is the first performance value is greater than the second performance value, the performance of the second facility is better than the performance of the first facility.

11. The method of measuring and reporting environmental performance of first and second facilities, according to claim 6, wherein when the comparison of the first and second performance values is the first performance value is less than the second performance value, the performance of the first facility is better than the performance of the second facility.

12. A method of measuring and reporting environmental performance of a facility based on multiple environmental indicators of the facility, comprising the steps of:

selecting a plurality of environmental indicators from the facility;

determining the total number, n, of the environmental indicators;

identifying indicator values, $I_i$, of each of the environmental indicators, respectively;

identifying first benchmark values, $B_i$, for each of the first environmental indicators, respectively, including the steps of:

first, identifying a first data group of indicator values of the respective environmental indicator collected from a plurality of facilities;

second, determining the mean and standard deviation values of the distribution containing the data of the first data group;

third, removing a cluster of data from the first data group to form a second data group;

fourth, determining the mean and standard deviation values of the distribution containing the data of the second data group; and fifth, comparing the mean and standard deviation value of the first data group to the mean and standard deviation value of the second data group;

whereby when the comparison of the mean and standard deviation values of the first and second data groups is that the mean and standard deviation values of the first and second data groups are equal, another cluster of data is removed from the first data group to form the second data group and the fourth and fifth steps are repeated, and when the comparison of the mean and standard deviation values of the first and second data groups is that the mean and standard deviation values of the first and second data groups are not equal, the cluster of data removed from the first data group is the benchmark value for the respective environmental indicator;

determining a performance value, $D_i$, of the first facility by the formula:

$$D_i = \left[ \frac{n}{\sum_{i=1}^{n} \left[\frac{I_i}{B_i}\right]^2} \right]^{\frac{1}{2}}; \text{ and}$$

reporting the performance value of the facility.

* * * * *